Patented Mar. 4, 1941

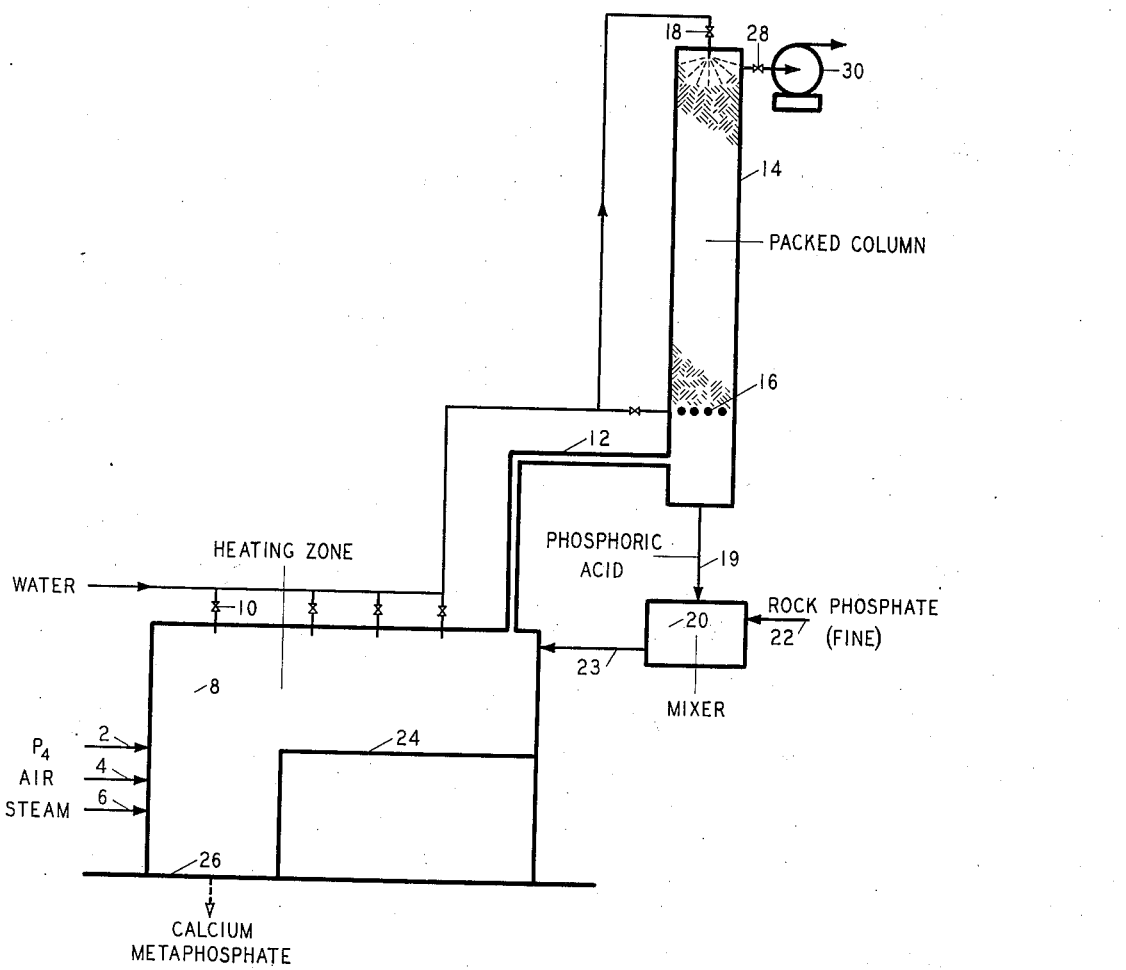

2,233,401

UNITED STATES PATENT OFFICE 2,233,401

MAKING CALCIUM METAPHOSPHATE

Raymond L. Copson, near Sheffield, Ala.

Application November 9, 1939, Serial No. 303,627

3 Claims. (Cl. 23—103)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of making calcium metaphosphate.

The principal object of this invention is to provide an improvement in the process of making calcium metaphosphate from calcium containing material and metaphosphoric acid wherein the reactants may be more accurately proportioned and more thoroughly mixed. Another object of this invention is to provide for the direct utilization of hot phosphoric acid in the production of calcium metaphosphate. Other objects of this invention include the provision wherein metaphosphoric acid produced from elemental phosphorus may be either hydrated to orthophosphoric acid or used directly to react with calcium containing material.

It has been proposed to produce calcium metaphosphate from calcium containing material reactive with metaphosphoric acid to form calcium metaphosphate and metaphosphoric acid by forming a hot gaseous mixture containing metaphosphoric acid in a high temperature heating zone in which the lowest temperature zone is slightly above the melting point of the calcium metaphosphate formed, by separating the metaphosphoric acid from the gaseous mixture outside the heating zone, by returning the separated metaphosphoric acid to the heating zone, by admitting the calcium containing material to the metaphosphoric acid so returned to the heating zone, and by maintaining the temperature in the heating zone so that the calcium containing material and metaphosphoric acid react to form fused calcium metaphosphate. In the above process provision is made for recovery and return of metaphosphoric acid volatilized during the process.

I have discovered an improvement in the above process for making calcium metaphosphate wherein hot metaphosphoric acid is separated from the hot gaseous mixture containing the same, the hot metaphosphoric acid is mixed with a calcium containing material reactive with the same outside of the high temperature heating zone and the mixture of reactants delivered to a high temperature heating zone wherein the reaction is completed and the fused calcium metaphosphate is formed. The metaphosphoric acid in the hot gaseous mixture may be hydrated to orthophosphoric acid and the hot orthophosphoric acid likewise separated therefrom and mixed with calcium containing material outside the heating zone into which it is subsequently delivered for the completion of the reaction and formation of fused calcium metaphosphate.

In the accompanying drawing which forms a part of the specification, the figure is a diagrammatic, vertical, sectional view of one form of apparatus for the embodiment of my invention. Elemental phosphorus through line 2, air through line 4, and steam through line 6, are admitted into the heating zone 8, where the elemental phosphorus is oxidized to phosphorus pentoxide and the phosphorus pentoxide is hydrated to metaphosphoric acid. The hydration of the phosphorus pentoxide to metaphosphoric acid and partial cooling of the hot gaseous mixture for subsequent separation of the metaphosphoric acid is attained by admitting water or other suitable aqueous fluid into the heating zone through one or more of a plurality of inlets, represented by inlet 10. The cooled mixture carrying the metaphosphoric acid passes through conduit 12 into the bottom of a packed column 14, in which the packing is supported upon a water cooled grate 16, wherein the temperature gradiant throughout is maintained such that the temperature required for the production of metaphosphoric acid prevails at the bottom of packed column 14. A temperature above the dew point of the gaseous mixture, containing a substantial proportion of steam, is maintained at the top of the packed column 14 by admitting water or other suitable aqeous fluid through one or more of a plurality of valved inlets, represented by valved inlet 18. The hot metaphosphoric acid separated into the bottom of packed column 14, passes through line 19 into mixer 20 where it is intimately mixed with fine rock phosphate or other fine calcium containing material admitted through line 22. The hot mixture resulting therefrom is admitted to that portion of the combustion chamber above the elevated hearth 24 through one or more of a plurality of inlets, represented by inlet 23. The temperature in the combustion chamber is so regulated that the temperature on the elevated hearth 24 is such as to cause the reaction between the calcium containing material and metaphosphoric acid to be completed and to form fused calcium metaphosphate. This fused calcium metaphosphate is withdrawn from the hearth 26 or from the side or sides of the elevated hearth 24 as required depending upon the temperature gradient maintained throughout the heating zone. The gaseous mixture which passes to the top of the packed column 14 is withdrawn through valved line 28 through an exhauster 30 which maintains a proper pressure differential throughout the system.

It is evident that there are numerous factors which will influence conditions for the most satisfactory operation of my invention, the actual limits of which cannot be established except by a detailed study of each set of raw materials and the intermediate and finished products involved.

The metaphosphoric acid is preferably produced by the oxidation of elemental phosphorus to phosphorus pentoxide, by the hydration of the phosphorus pentoxide to metaphosphoric acid, by cooling the hot gaseous mixture carrying the phosphorus pentoxide, and by separating the hot metaphosphoric acid from such a hot gaseous mixture. Also the metaphosphoric acid carried in a hot gaseous mixture containing the same may be hydrated to orthophosphoric acid and hot orthophosphoric acid separated therefrom.

The calcium containing material used may be any such material which is reactive with metaphosphoric acid to form calcium metaphosphate and with orthophosphoric acid to form fused calcium metaphosphate, depending upon which acid is used. Naturally, because of its high $P_2O_5$ content, rock phosphate is preferred for this purpose. However, limestone, lime or any other readily available calcium containing material which contains the above requirements may be equally suitable, although not necessarily as economical. In the present invention wherever the hot metaphosphoric acid or the hot orthophosphoric acid is mixed with the calcium containing material outside of the zone heated by the oxidation of the elemental phosphorus, it is an improvement over the prior process wherein the metaphosphoric acid and the calcium containing material were admitted directly to such a heated zone without an opportunity for positive mixing and accurate proportioning of the reactants. The hot mixture resulting therefrom is then delivered to the heated zone wherein the reaction is completed and fused calcium metaphosphate is formed.

Should there be no appreciable volatilization of metaphosphoric acid from the partially reacted mixture of metaphosphoric acid and calcium containing material in the heated zone, it would be necessary to use only substantially stoichiometrical proportions of either the hot metaphosphoric acid or the hot orthophosphoric acid and the calcium containing material in preparing such mixture. However, since the reaction within the mixture is not entirely completed by the time the mixture enters the heated zone, some volatilization of the metaphosphoric acid used, or metaphosphoric acid resulting from the dehydration of orthophosphoric acid used, will occur. In view of the intimate mixing of the reactants and substantial reaction taking place within the mixture before admission to the heated zone, there is a minimum of metaphosphoric acid volatilized in counterdistinction to the process of which this is an improvement wherein the conditions are such that a substantial proportion of the metaphosphoric acid is volatilized. However, in either case the metaphosphoric acid is separated from the hot gaseous mixture carrying the same and is returned directly to the mixer or to the heated zone. Therefore, the present invention materially reduces the amount of metaphosphoric acid which must be separated and recycled in the system. Therefore, it is then only necessary, in charging the reactants to the mixer, to use an excess of hot metaphosphoric acid, or hot orthophosphoric acid, over the stoichiometrical proportions for reaction with the calcium containing material which corresponds to the amount of metaphosphoric acid volatilized from the incompletely reacted mixture.

It will be seen, therefore, that this invention actually may be carried out by the use of various modifications and changes without departing from its spirit and scope, with only such limitations placed thereon as may be imposed by the prior art.

I claim:

1. Process of making calcium metaphosphate from rock phosphate and metaphosphoric acid, which comprises forming a hot gaseous mixture containing metaphosphoric acid in a heating zone in which the lowest temperature is above the melting point of the calcium metaphosphate subsequently formed, separating hot metaphosphoric acid from said gaseous mixture outside said heating zone, mixing said hot metaphosphoric acid and the rock phosphate outside said heating zone, returning the mixture so prepared to said heating zone, and maintaining the temperature in said heating zone so that said mixture will react and form fused calcium metaphosphate.

2. Process of making calcium metaphosphate from limestone and metaphosphoric acid, which comprises forming hot gaseous mixture containing metaphosphoric acid in a heating zone in which the lowest temperature is above the melting point of the calcium metaphosphate subsequently formed, separating hot metaphosphoric acid from said gaseous mixture outside said heating zone, mixing said hot metaphosphoric acid and the limestone outside said heating zone, returning the mixture so prepared to said heating zone, and maintaining the temperature in said heating zone so that said mixture will react and form fused calcium metaphosphate.

3. Process of making calcium metaphosphate from calcium containing material, reactive with metaphosphoric acid to form calcium metaphosphate, and metaphosphoric acid, which comprises forming a hot gaseous mixture containing metaphosphoric acid in a heating zone in which the lowest temperature is above the melting point of the calcium metaphosphate subsequently formed, separating the hot metaphosphoric acid from said gaseous mixture outside said heating zone, mixing said hot metaphosphoric acid and the calcium containing material outside said heating zone, returning the mixture so prepared to said heating zone, and maintaining the temperature in said heating zone so that said mixture will react and form fused calcium metaphosphate.

RAYMOND L. COPSON.